United States Patent
Grisenthwaite et al.

(10) Patent No.: US 8,924,615 B2
(45) Date of Patent: Dec. 30, 2014

(54) COMMUNICATION OF MESSAGE SIGNALLED INTERRUPTS

(71) Applicant: ARM Limited, Cambridge (GB)

(72) Inventors: Richard Roy Grisenthwaite, Cambridge (GB); Anthony Jebson, Cambridge (GB); Andrew Christopher Rose, Cambridge (GB); Matthew Lucien Evans, Cambridge (GB)

(73) Assignee: ARM Limited, Cambridge (GB)

( * ) Notice: Subject to any disclaimer, the term of this patent is extended or adjusted under 35 U.S.C. 154(b) by 216 days.

(21) Appl. No.: 13/661,456

(22) Filed: Oct. 26, 2012

(65) Prior Publication Data
US 2014/0122760 A1 May 1, 2014

(51) Int. Cl.
G06F 13/26 (2006.01)
G06F 13/24 (2006.01)

(52) U.S. Cl.
CPC .............. *G06F 13/26* (2013.01); *G06F 13/24* (2013.01)
USPC ............................ 710/264; 710/266; 710/268

(58) Field of Classification Search
USPC .......................................... 710/260–269, 48
See application file for complete search history.

(56) References Cited

U.S. PATENT DOCUMENTS

| 5,317,747 | A | 5/1994 | Mochida et al. |
| 5,758,169 | A | 5/1998 | Nizar et al. |
| 6,629,179 | B1 * | 9/2003 | Bashford ...................... 710/260 |
| 7,328,296 | B1 | 2/2008 | Marmash et al. |
| 8,510,491 | B1 * | 8/2013 | Hendel et al. ................. 710/260 |
| 2006/0085582 | A1 | 4/2006 | Shikano et al. |
| 2006/0095624 | A1 | 5/2006 | Raj et al. |
| 2008/0126648 | A1 | 5/2008 | Brownlow et al. |

FOREIGN PATENT DOCUMENTS

| JP | 10-11411 | 1/1998 |
| JP | H1011411 | 1/1998 |

OTHER PUBLICATIONS

International Search Report and Written Opinion of the International Searching Authority mailed Nov. 29, 2013 in PCT/GB2013/052265.
UK Search Report dated Jan. 24, 2014 in GB 1315345.7.

* cited by examiner

*Primary Examiner* — Glenn A Auve
(74) *Attorney, Agent, or Firm* — Nixon & Vanderhye P.C.

(57) ABSTRACT

A global interrupt number space 38 is provided for use in message signalled interrupts. Interrupt destinations 10, 12, 14, 16 are provided with pending interrupt caches 24 with either backing storage provided by global pending status memory 34 shared by all the caches or separate individual pending status memories 56. The interrupt number space may be divided into regions with programmable mapping data being used to indicate which interrupt destinations are responsible for which regions. When interrupts are migrated from one interrupt destination to another, then such programmable mapping data is updated. Pending interrupts may be flushed back to the global pending status memory 34 during the reassignment process such that this pending interrupt data may be picked up by the newly responsible interrupt destination.

23 Claims, 5 Drawing Sheets

COMMUNICATION OF MESSAGE SIGNALLED INTERRUPTS

BACKGROUND OF THE INVENTION

1. Field of the Invention

This invention relates to the field of data processing systems. More particularly, this invention relates to the communication of message signalled interrupts between one or more interrupt sources and a plurality of interrupt destinations.

2. Description of the Prior Art

It is known to provide communication mechanisms which support message signalled interrupts passed between one or more interrupts sources, (e.g. devices within a computer system) and a plurality of interrupt destinations (e.g. processors for processing those interrupts). It is possible that each individual interrupt destination may be formed so as to be responsive to a hundred or more different interrupts with respective interrupt numbers. The message signalled interrupt contains an address of the interrupt destination and an interrupt number at that interrupt destination. Providing such a large number of interrupt numbers allows information to be passed from the interrupt source to the interrupt destination by virtue of the interrupt number used and thereby reduce interrupt communication overhead and speed up interrupt processing.

It is also known to provide data processing systems with multiple processors where the number of processors currently active may be dynamically changed over time. When the processing workload is high, then all the processors may be active, but if the processing workload falls, then one or more of the processors may be shut down so as to save power. In this circumstance, it is necessary that a processor which is shutting down handover responsibility for any pending interrupts to be processed by that processor to a different processor. In one scenario all of the processors may shut down and transfer the responsibility for their pending interrupts onto a single remaining processor and all of the shutdown processors could have been in a state in which all of their interrupts where pending. In order to deal with this circumstance, the processor taking over responsibility must have storage resources, typically registers forming part of an interrupt handler for that processor, in sufficient number that potentially all of the interrupts from all of the other processors could be buffered.

It will be seen that the above approach does not scale well when the number of processors increases and the number of interrupts increases. The provision of registers for buffering pending interrupts associated with each processor by extending the existing storage means mechanisms leads to a requirement for an excessive overhead that undesirably increases circuit area and power consumption.

SUMMARY OF THE INVENTION

Viewed from one aspect the invention provides an interrupt communication apparatus for communicating message signalled interrupts between one or more interrupt sources and a plurality of interrupt destinations, said apparatus comprising:

interrupt translation circuitry configured to receive a message signalled interrupt from one of said one or more interrupt sources and to trigger storage of pending status data with an associated storage location within pending status data storage circuitry, said storage location representing an interrupt number of said message signalled interrupt within a global interrupt number space shared by said plurality of interrupt destinations; and a plurality of interrupt data reading circuits each associated with a respective one of said plurality of interrupt destinations and configured to read pending status data with an associated interrupt number within said global interrupt number space from said pending status data storage circuitry and to trigger interrupt processing by said respective one of said plurality of interrupt destination.

The present technique recognises that rather than generating message signalled interrupts with addresses directing them to particular processors and interrupt numbers specifying the interrupt for that processor, it is advantageous to support a global interrupt number space which is shared by the plurality of interrupt destinations (e.g. processors). Providing such a global interrupt number space facilitates the more efficient storage, handling and reassignment of interrupts between interrupt destinations. It will be appreciated that in many cases only a relatively small number of the total possible number of the interrupts will be pending at any given time, but the system must nevertheless be able to cope with situations in which a large number or all of the pending interrupts are pending at a given time.

One possibility for the increased efficiency with which pending status data interrupts may be handled is to provide the pending status data storage circuitry in a form which includes a plurality of pending interrupt caches each associated with a respective one of the interrupt destinations and configured to store data indicative of interrupt numbers pending for the respective interrupt destination. In this way, the large global interrupt number space may still be provided and yet a relatively small and efficient cache used to provide high speed access to pending status data associated with each interrupt destination. The pending status data storage circuitry as a whole can store the full global interrupt number space, but the pending interrupt caches can cache local copies of this data as relevant to particular interrupt destinations.

The pending interrupt caches may be configured as writeback caches. In this way, if storage space is available within a pending cache, then pending interrupt data may be directly written to this pending interrupt cache when it is received without needing to be written back to backing storage of the cache. This reduces power consumption and speeds up operation.

If a new message signalled interrupt is received and will result in pending status data for an interrupt destination whose cache is already full, then the lowest priority pending interrupt data store of those already stored in that cache and the new interrupt is spilled to the backing store to make room, if appropriate, for a potentially higher priority newly arriving piece of interrupt data.

In a similar way, if the pending interrupt cache is not full and there is pending data status stored within the backing store that is not present within the cache, then the highest priority pending interrupt data may be fetched from the backing store into the pending interrupt cache.

In addition to the global storage of pending status data, it is also possible to provide a global storage space for the priority data and the enable data associated with the interrupts. This priority data and enable data may also be cached by the respective interrupt destinations. This priority and enable data is thus available for rapid use while the backing storage provides the capacity to deal with a large volume of this priority and enable data. The caching of priority and enable data also recognises that there is locality within this data. For example, if priority data for a particular interrupt has been fetched into the priority cache, then there is a significant likelihood that the same interrupt will arise again shortly and the priority data will already be present within the priority cache.

In some embodiments it is possible to provide groups of continuous interrupt numbers which share a priority level. The ability to specify a priority level at the ultimate level of granularity of an individual interrupt number may not in fact be necessary in many real life situations and storage space may be saved by providing priority levels only in respect of groups of contiguous interrupt numbers.

In some embodiments a plurality of mapping controllers may be provided each associated with one of the interrupt destinations and serving to indicate one or more regions within the global interrupt number space for which the interrupt destination concerned is responsible for servicing the pending interrupts. Thus, while it is possible for each interrupt destination to handle any interrupt number, it will only do so if the appropriate mapping data is stored within its mapping controller. The global interrupt number space may be diverted between the interrupt destinations using the programmable mapping data so that each of the interrupt destinations need only concern itself with maintaining its cache of pending interrupt data and service interrupts in respect of those regions for which it is responsible.

In such embodiments the pending status data storage circuitry may include a global pending status memory which is shared by the plurality of interrupt data reading circuits. This global pending status memory may be a dedicated memory provided specifically for the purpose of storing pending bits or alternative may be part of the general purpose memory of the computer system as a whole with the general purpose memory being capable of storing other data in differing circumstances.

In the context of this type of embodiment, the pending interrupt cache will store pending interrupts in respect of those regions of memory for which the programmable mapping data indicates that the associated interrupt destination is responsible. When there is a reassignment of responsibility for a given interrupt number, then any relevant pending interrupt data stored within the pending interrupt cache of the current interrupt destination is flushed back to global pending status memory from where it may be picked up by the newly responsible interrupt destination. Pending interrupt data which is already present within the global pending status memory need not be moved if responsibility is assigned since all of the interrupt destinations share that global pending status memory and will pick up the pending status data into their pending interrupt caches when their programmable mapping data is updated to indicate that they now have responsibility for such pending interrupts.

When migration of responsibility for particular interrupt numbers is taking place, then any newly received message signalled interrupts are stalled by the interrupt translation circuitry until a flush back to the backing storage has completed in respect of any cached pending interrupt data.

Another type of embodiment of the present techniques provides a separate pending status memory for each of the plurality of interrupt destinations. The separate pending status memories may be capable of storing the entire global interrupt number space and can utilise, for example, random access memory storage rather than dedicated registers and thus exploit technique such as caching to improve speed and efficiency.

The separate pending status memory provided for each interrupt destination may, for example, be a dedicated memory dedicated to storing pending bits or a portion of a general purpose memory that may also store other data in addition to the pending bits. The pending status memory may be a portion of the general memory space of the data processing system concerned.

In the context of this type of embodiment when an interrupt number is migrated away from a current interrupt destination to a new interrupt destination, then any corresponding entry in a separate pending status memory for the current interrupt destination is transferred to the separate pending status memory of the new interrupt destination. Thus, pending interrupt data to be reassigned is transferred from that status memory to the status memory of the newly responsible interrupt destination for that interrupt number.

When performing such reassignment of interrupt numbers between interrupt destinations, newly received message signalled interrupts can be stalled by the interrupt translation circuitry until the transfer is complete.

Viewed from another aspect the present invention provides an interrupt communication apparatus for communicating message signalled interrupts between one or more interrupt sources and a plurality of interrupt destinations, said apparatus comprising:

interrupt translation means for receiving a message signalled interrupt from one of said one or more interrupt sources and for triggering storage of pending status data with an associated storage location within pending status data storage means for storing pending status data, said storage location representing an interrupt number of said message signalled interrupt within a global interrupt number space shared by said plurality of interrupt destinations; and a plurality of interrupt data reading means, each associated with a respective one of said plurality of interrupt destinations, for reading pending status data with an associated interrupt number within said global interrupt number space from said pending status data storage means and for triggering interrupt processing by said respective one of said plurality of interrupt destination.

Viewed from a further aspect the present invention provides a method of communicating message signalled interrupts between one or more interrupt sources and a plurality of interrupt destinations, said method comprising the steps of:

receiving a message signalled interrupt from one of said one or more interrupt sources;

triggering storage of pending status data with an associated storage location within pending status data storage circuitry, said storage location representing an interrupt number of said message signalled interrupt within a global interrupt number space shared by said plurality of interrupt destinations;

reading for each respective one of said plurality of interrupt destinations pending status data with an associated interrupt number within said global interrupt number space from said pending status data storage circuitry; and triggering interrupt processing by said respective one of said plurality of interrupt destination.

The above, and other objects, features and advantages of this invention will be apparent from the following detailed description of illustrative embodiments which is to be read in connection with the accompanying drawings.

BRIEF DESCRIPTION OF THE DRAWINGS

Embodiments of the present invention will now be described by way of example only, with reference to the accompanying drawings in which.

DESCRIPTION OF THE EMBODIMENTS

Figure 1:
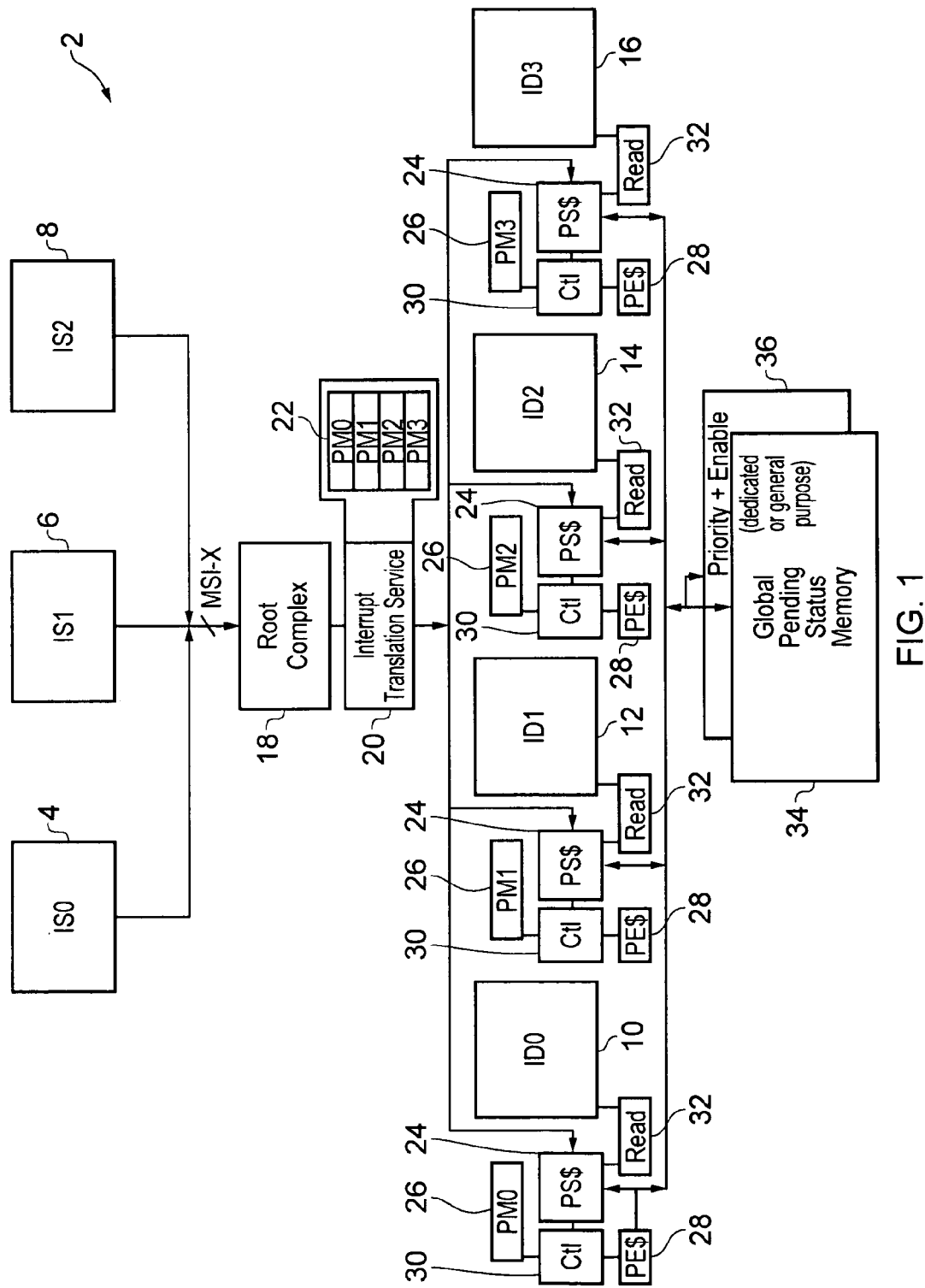
FIG. 1 schematically illustrates a data processing system incorporating a plurality of interrupt sources, a plurality of interrupt destinations and an interrupt communication apparatus for communicating message signalled interrupts.

FIG. 1 schematically illustrates a data processing system 2 incorporating a plurality of data interrupt sources 4, 6, 8 and a plurality of interrupt destinations 10, 12, 14, 16. The interrupt destinations may typically be different processors within a multiprocessor system. These individual processors may be dynamically powered up and powered down depending upon the processing workload. When a processor is powered down, then any pending interrupts for that processor need to be reassigned to another processor for servicing.

The interrupt sources 4, 6, 8 may take a variety of different forms, such as U/O devices, DMA engines and other peripheral devices. The interrupt sources 4, 6, 8 generate message signalled interrupts MSI-X which are supplied to a root complex 18. Such message signalled interrupts are, for example, known from systems supporting PCI-express. Such message signalled interrupts in themselves and the root complex 18 will not be described further herein as they will be familiar to those in this technical field.

One aspect of the message signalled interrupts which differs from the known techniques is the use of a global interrupt number space which is shared by all of the interrupt destinations 10, 12, 14, 16. Thus, instead of a message signalled interrupt specifying as its address a particular interrupt destination and giving an interrupt number specific to that interrupt destination, instead a larger number of interrupt numbers are provided by the global interrupt number space and are allocated by interrupt translation circuitry 22 to the different interrupt destinations 10, 12, 14, 16.

As illustrated in FIG. 1, the interrupt translation circuitry 20 is responsive to programmable mapping data 22 which indicates different regions within the global interrupt number space for which different interrupt destinations 10, 12, 14, 16 are responsible. The interrupt translation circuitry 22 directs a received message signalled interrupt to a desired interrupt destination 10, 12, 14, 16 in order that it may be serviced.

The individual interrupt destinations 10, 12, 14, 16 each have associated with them a pending interrupt cache 24, a mapping controller 26, a priority and enable cache 28 (this may be in the form of separate individual priority and enable caches or a unified priority and enable cache), interrupt data reading circuits 32 and a cache controller 30. The pending interrupt cache 24 is configured as a writeback cache such that a newly received interrupt will be stored (space permitting) within the pending interrupt cache 24 and will not be written out to the global pending status memory 34 unless it is spilled or flushed from the pending interrupt cache 24. The interrupt data reading circuit 32 reads pending interrupt data stored within the pending interrupt cache 24 and generates interrupt signals which are supplied to the associated interrupt destination 10, 12, 14, 16 in order to trigger interrupt processing in accordance with the specified interrupt number.

It will be appreciated that the different interrupt numbers may have different priority levels associated therewith. This priority information may be stored within global priority data storage circuitry 28, 36. It will be appreciated that the priority data storage circuitry in this example takes the form of the priority and enable cache 28 in combination with the priority and enable global memory 36. In a similar way, the pending status data storage circuitry for the pending interrupt data takes the form of the pending interrupt cache 24 and the global pending status memory 34, which serves as a backing store to the pending interrupt cache 24.

The cache controllers 30 control the fetching of data to the caches 24, 28, the spilling of data from the caches 24, 28 and the flushing of the caches 24, 28. If the pending interrupt cache 24 is full and a new interrupt is received, then the lowest priority of the interrupts held within the pending interrupt cache and the newly received interrupt will be spilled back to the global pending status memory 34. In a similar way, if the pending interrupt cache 24 is not full and there is a pending bit indicating a pending interrupt set within the global pending status memory for a region for which that particular interrupt destination and pending interrupt store 24 are responsible, then the highest priority such pending interrupt will be fetched back to the pending interrupt cache 24 from where it may be serviced by the interrupt destination 10, 12, 14, 16 concerned.

The mapping controllers 26 store mapping data comprising a field of bits with each of these bits corresponding to a region of contiguous interrupt numbers within the global interrupt number space. If a particular bit within the mapping data is set, then this indicates that the associated interrupt destination is responsible for servicing interrupts within the corresponding region of the global interrupt number space concerned. Thus, the cache controller 30 may read the mapping data to determine which regions of the pending bit data stored within the global pending status memory 34 are the responsibility of the interrupt destination associated with that mapping controller 26. Thus, the cache controller 30 will, when space allows within the pending interrupt cache 24, fetch pending interrupt data indicated by pending bits from the specified regions for that interrupt destination for servicing by that interrupt destination. When a region is reassigned between interrupt destinations, such as if an interrupt destination is being powered down, then the programmable mapping data will be altered to reflect the new responsibility of the interrupt destination taking over servicing of interrupts from regions within the global interrupt number space that were previously managed by the interrupt destination which is being powered down. When such transfers are taking place, the interrupt translation circuitry 20 serves to stall any newly received interrupts for the regions of interrupt numbers concerned such that the newly responsible interrupt destination will be appropriately set up (i.e. aware of its responsibility for those regions) before those interrupts reach the newly responsible interrupt destination.

The priority and enable data associated with the different interrupts is stored within the priority and enable caches 28 with the global priority and enable memory 36 serving as a backing store thereto. The priority and enable caches 28 may benefit from locality within the accesses made to particular priority and enable data as if a particular interrupt number arises for which the priority and enable data is needed, then it is likely that the same interrupt, or an interrupt nearby in the interrupt number space, will arise shortly thereafter. Thus, the priority and enable data for such a new interrupt is statistically likely to already be present within the priority and enable cache 28. The priority data indicates a priority level which controls the order in which pending interrupts are serviced. Pending interrupts having a higher priority level are serviced before those of a lower priority level. The enable data indicates whether a particular interrupt number is enabled for the system as a whole or for a particular interrupt destination.

Figure 2:
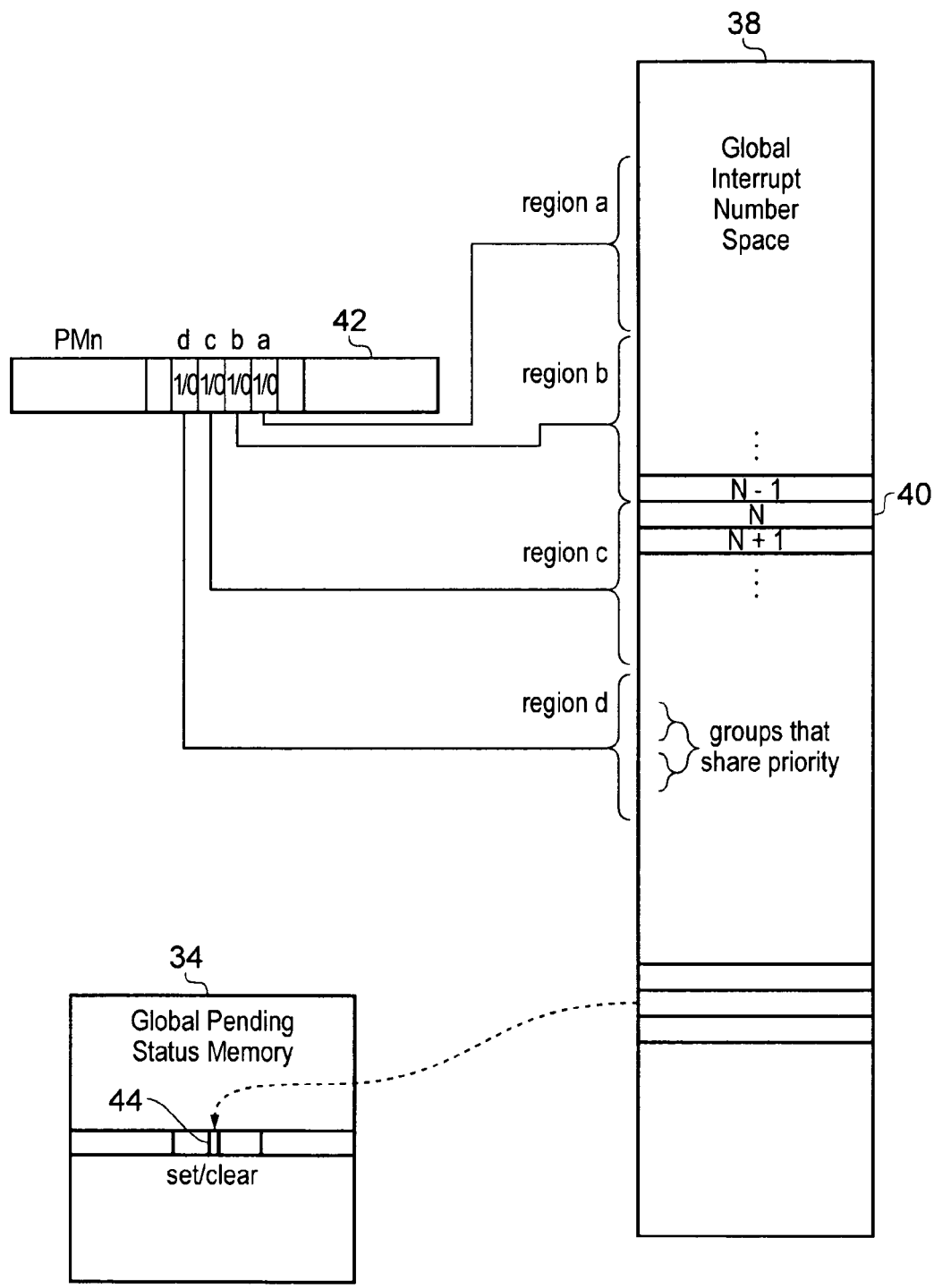
FIG. 2 schematically illustrates a global interrupt number space divided into a plurality of regions by programmable mapping data and a relationship between interrupt numbers and bits within a global pending status memory.

FIG. 2 schematically illustrates the global interrupt number space 38. Individual interrupt numbers N 40 are located within this global interrupt number space 38. The global interrupt number space is divided into a plurality of regions each composed of contiguous interrupt numbers. As previously discussed, each of these regions corresponds to a bit within programmable mapping data 42. The programmable mapping data is supplied for each of the interrupt destinations 10, 12, 14, 16 and indicates which regions of the global interrupt number space that interrupt destination is responsible for servicing. The programmable mapping data is also stored within registers 22 of the interrupt translation circuitry 20 which is responsible for managing and coordinating the programmable mapping data. The programmable mapping data may be set up under software control by, for example, operating system software or may be hardwired configuration in some embodiments.

Within each of the regions, there are provided multiple groups of interrupt numbers that share the same priority level. It is not necessary in some embodiments to have priority levels specified at the fine grained level of an individual priority level per interrupt number, rather a group of contiguous interrupt numbers can share a priority level. Interrupt enables may be set on an individual interrupt number by interrupt number basis.

Also illustrated in FIG. 2 is the global pending status memory 34. This provides a pending bit 44 for each of the interrupt numbers within the global interrupt number space 38. If this pending bit is set, then this indicates that there is a pending interrupt from the associated interrupt number. Thus, the storage location of a pending bit within the global pending status memory 34 indicates the corresponding interrupt number within the global interrupt number space 38. If the pending bit is set, then there is a pending interrupt and if the pending bit is clear, then there is no pending interrupt. The global pending status memory 34 provides dense and efficient storage of pending status data for the interrupts.

Figure 3:
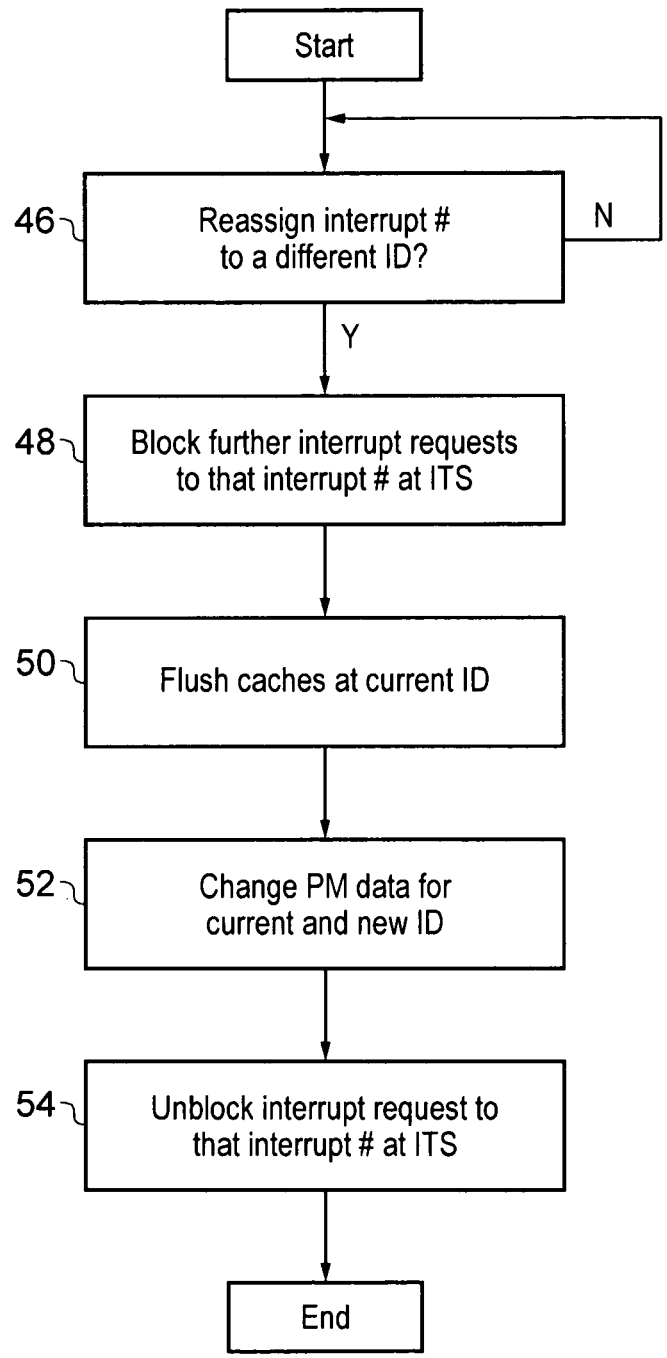
FIG. 3 is a flow diagram schematically illustrating the reassignment of an interrupt number from one interrupt destination to another interrupt destination in the embodiment of FIG. 1.

FIG. 3 is a flow diagram schematically illustrating the reassignment of an interrupt number between interrupt destinations 10, 12, 14, 16. At step 46 processing waits until there is an interrupt number to reassign. Step 48 shows to the interrupt translation circuitry 20 blocking further interrupt requests to that interrupt number by stalling those further interrupt request at the interrupt translation circuitry 20. At step 50 the pending interrupt cache 24 which is associated with the interrupt number being switched is flushed back to the global pending status memory 34. At step 52 the programmable mapping data for the current and new interrupt destinations are updated to indicate the change in responsibility. In the example embodiment of FIG. 1 interrupt numbers are reassigned on a region-by-region basis (in other embodiments individual interrupts may be reassigned). At step 54 the blocking of further interrupt requests to the reassigned interrupt number is removed by the interrupt translation circuitry 20.

Figure 4:
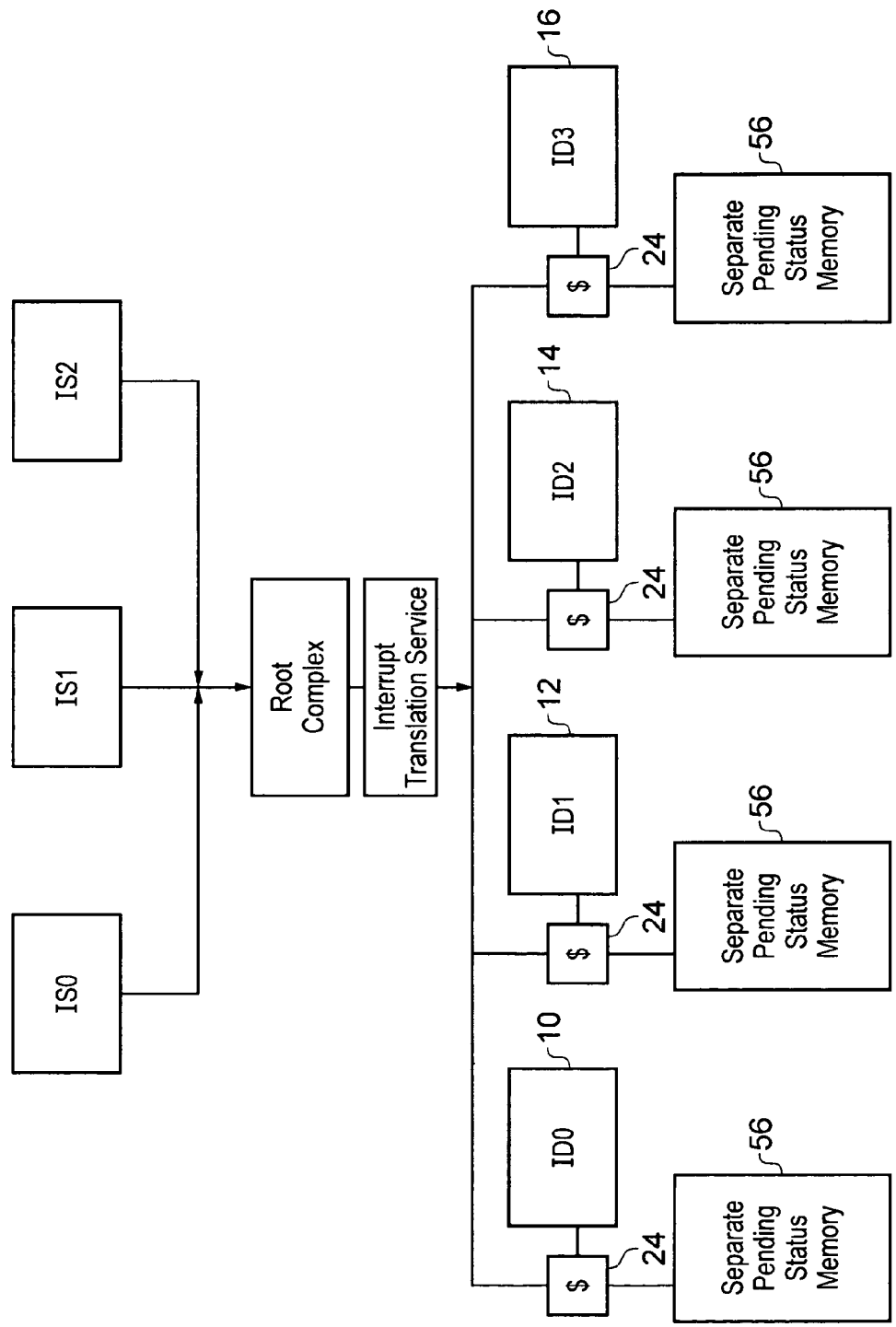
FIG. 4 schematically illustrates a second example embodiment of an apparatus for processing data having a plurality of interrupt sources, a plurality of interrupt destinations, and interrupt communication apparatus including a plurality of separate pending status memories, each dedicated to a particular interrupt destination.

FIG. 4 illustrates a second example embodiment. This example embodiment is similar to that illustrated in FIG. 1 with the exception that separate pending status memories 56 are provided for each of the interrupt destinations 10, 12, 14, 16. Many common components (such as the reading circuitry 32) with the FIG. 1 embodiment have been omitted from FIG. 4 for the sake of clarity but are present in practice. In this embodiment, programmable mapping data is not provided dividing the global interrupt number space into regions and interrupts may be reassigned between interrupt destinations 10, 12, 14, 16 on an individual basis. When a given interrupt destination 10, 12, 14, 16 is powered down, then the pending interrupt data it is storing within its pending interrupt cache 24 and its associated separate pending status memory 56 is read and copied over into the separate pending status memory 56 (and possibly pending interrupt cache 24) of the interrupt destination which is taking over responsibility for those pending interrupts. This example embodiment avoids the need for the programmable mapping data and the division of the global interrupt number space and provides separate pending status memories 56 each capable of storing the full global interrupt number space. This embodiment has the disadvantage that pending bits need to be copied between the separate pending status memories 56 when we reassignments occurs. In contrast, the shared global pending status memory 34 of FIG. 1 stores a unified view of all of the pending interrupts and no such inter-memory copying is needed. The provision of the storage for the pending status data within the pending interrupt cache 24 and the separate pending status memory 56 allows for a relatively highly dense data storage as the pending status memory 56 may be efficient RAM memory rather than registers or flops. The separate pending status memory 56 may be a dedicated block of RAM or part of system RAM that has been assigned for this purpose (i.e. a portion of a general purpose memory).

Figure 5:
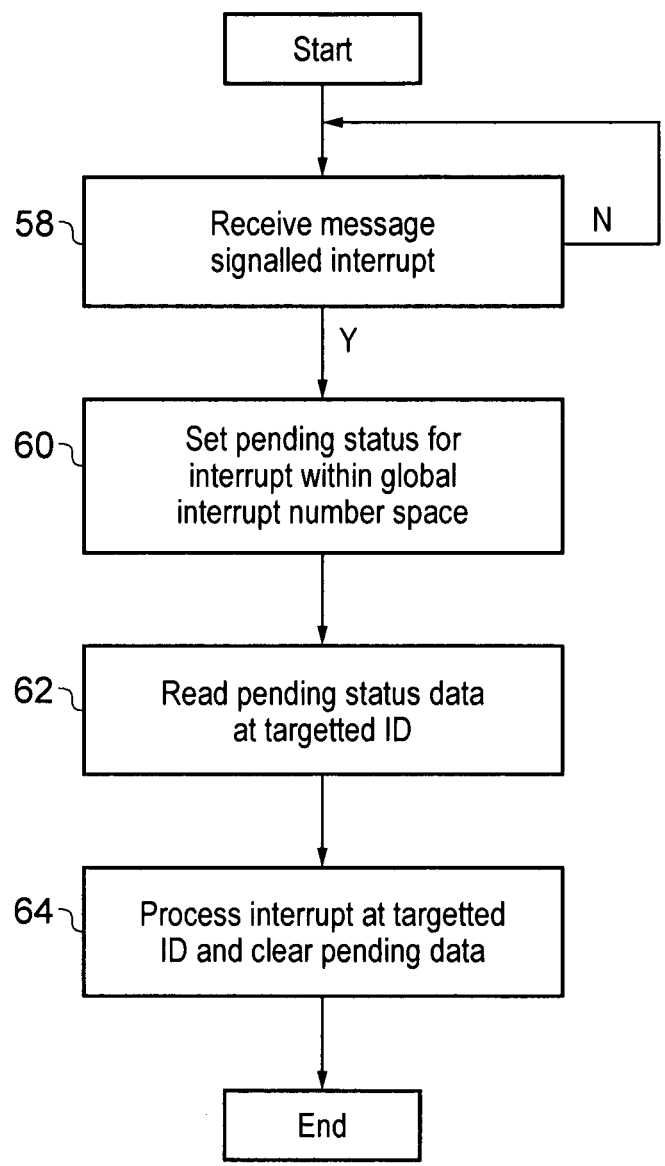
FIG. 5 is a flow diagram schematically illustrating the communication of a message signalled interrupt via a global interrupt number space.

FIG. 5 is a flow diagram schematically illustrating communication of a message signalled interrupt. At step 58 a message signalled interrupt is received. At step 60 pending status data for the interrupt number concerned is set within the global interrupt number space 38. This pending status data may be stored within the pending interrupt cache 24 or one of the pending status memories 34, 56. At step 62, the reading circuitry 32 reads the pending status data at the targeted interrupt destination. Step 64 then processes the interrupt at the targeted interrupt destination and clears the pending interrupt data to indicate that the interrupt has been deal with.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Interrupt communication apparatus for communicating message signalled interrupts between one or more interrupt sources and a plurality of interrupt destinations, said apparatus comprising:

interrupt translation circuitry configured to receive a message signalled interrupt from one of said one or more interrupt sources and to trigger storage of pending status data with an associated storage location within pending status data storage circuitry, said storage location representing an interrupt number of said message signalled interrupt within a global interrupt number space shared by said plurality of interrupt destinations; and a plurality of interrupt data reading circuits each associated with a respective one of said plurality of interrupt destinations and configured to read pending status data with an associated interrupt number within said global interrupt number space from said pending status data storage circuitry and to trigger interrupt processing by said respective one of said plurality of interrupt destination.

2. Interrupt communication apparatus as claimed in claim 1, wherein said pending status data storage circuitry includes a plurality of pending interrupt caches each associated with a respective one of said interrupt destinations and configured to store data indicative of interrupt numbers of one or more pending interrupts to be processed by said respective one of said interrupt destinations.

3. Interrupt communication apparatus as claimed in claim 2, wherein said pending interrupt caches are configured as write back caches such that, if storage space is available within a given pending interrupt cache, then pending status data for a newly received message signalling interrupt is written to said given pending interrupt cache without being written to any backing storage.

4. Interrupt communication apparatus as claimed in claim 3, wherein if said given pending interrupt cache is full, then pending status data of a lowest priority pending interrupt is spilled to said backing storage if newly received pending status data corresponds to a higher priority interrupt.

5. Interrupt communication apparatus as claimed in claim 3, wherein if said pending interrupt cache is not full, then pending status data for a highest priority pending interrupt within said backing storage is fetched from said backing storage to said pending interrupt cache.

6. Interrupt communication apparatus as claimed in claim 1, wherein said plurality of interrupt data reading circuits are configured to read priority data associated with a storage location within priority data storage circuitry corresponding to an interrupt number of a pending interrupt, said priority data indicating of a priority level of said pending interrupt.

7. Interrupt communication apparatus as claimed in claim 6, wherein said priority data storage circuitry includes a plurality of priority data caches each associated with a respective one of said plurality of interrupt destinations and storing recently accessed priority data for said respective one of said plurality of interrupt destinations.

8. Interrupt communication apparatus as claimed in claim 6, wherein said interrupt numbers are divided into a plurality of groups of contiguous interrupt numbers, each group of contiguous interrupt numbers sharing a priority level.

9. Interrupt communication apparatus as claimed in claim 1, wherein said plurality of interrupt data reading circuits are configured to read enable data associated with a storage location within enable data storage circuitry corresponding to an interrupt number of a pending interrupt, said enable data indicating whether or not said pending interrupt is enabled.

10. Interrupt communication apparatus as claimed in claim 9, wherein said enable data storage circuitry includes a plurality of enable data caches each associated with a respective one of said plurality of interrupt destinations and storing recently accessed enable data for said respective one of said plurality of interrupt destinations.

11. Interrupt communication apparatus as claimed in claim 1 comprising
a plurality of mapping controllers each configured to store programmable mapping data for a respective corresponding one of said plurality of interrupt destinations indicating one or more regions within said global interrupt number space for which said corresponding one of said plurality of interrupt destinations is responsible to respond to pending status data to perform interrupt processing; and
wherein said plurality of interrupt data reading circuits are configured to respond to said programmable mapping data for said respective one of said plurality of interrupt destinations by reading pending status data with an associated interrupt number within one or more regions indicated by said programmable mapping data and triggering interrupt processing by said respective one of said plurality of interrupt destination.

12. Interrupt communication apparatus as claimed in claim 11, wherein said pending status data storage circuitry includes a global pending status memory shared by said plurality of interrupt data reading circuits and storing pending bits with locations mapped to respective interrupt numbers, said pending bits indicating whether or not an interrupt is pending for respective interrupt numbers.

13. Interrupt communication apparatus as claimed in claim 12, wherein said global pending status memory is one of:
a dedicated memory dedicated to storing said pending bits; and
a portion of a general purpose memory, said general purpose memory configured to store other data in addition to said pending bits.

14. Interrupt communication apparatus as claimed in claim 11, wherein said pending status data storage circuitry includes a plurality of pending interrupt caches each associated with a respective one of said interrupt destinations and configured to store data indicative of interrupt numbers of one or more pending interrupts within said one or more region indicated by said programmable mapping data for said respective one of said interrupt destinations.

15. Interrupt communication apparatus as claimed in claim 11, wherein regions of interrupt numbers are reassigned between interrupt destinations by changing respective programmable mapping data for said interrupt destinations.

16. Interrupt communication apparatus as claimed in claim 15, wherein said pending status data storage circuitry includes a plurality of pending interrupt caches each associated with a respective one of said interrupt destinations and configured to store data indicative of interrupt numbers of one or more pending interrupts within said one or more region indicated by said programmable mapping data for said respective one of said interrupt destinations and when a region of interrupt numbers is migrated away from an interrupt destination, then a pending interrupt cache associated with said interrupt destination is flushed to backing storage before said programmable mapping data is changed.

17. Interrupt communication apparatus as claimed in claim 16, wherein any newly received message signalled interrupt to said region is stalled by said interrupt translation circuitry until said flush to said backing storage has completed.

18. Interrupt communication apparatus as claimed in claim 1, wherein said pending status data storage circuitry includes a separate pending status memory for each of said plurality of interrupt destinations for storing pending bits with locations mapped to respective interrupt numbers, said pending bits indicating whether or not an interrupt is pending for respective interrupt numbers.

19. Interrupt communication apparatus as claimed in claim 18, wherein each said separate pending status memory is one of:
a dedicated memory dedicated to storing said pending bits; and
a portion of a general purpose memory, said general purpose memory configured to store other data in addition to said pending bits.

20. Interrupt communication apparatus as claimed in claim 18, wherein when an interrupt number is migrated away from a current interrupt destination to a new interrupt destination, then any corresponding entry in a separate pending status memory of said current interrupt destination is transferred to a separate pending status memory of said new interrupt destination.

21. Interrupt communication apparatus as claimed in claim 20, wherein any newly received message signalled interrupt to said interrupt number is stalled by said interrupt translation circuitry until said transfer has completed.

22. Interrupt communication apparatus for communicating message signalled interrupts between one or more interrupt sources and a plurality of interrupt destinations, said apparatus comprising:
   interrupt translation means for receiving a message signalled interrupt from one of said one or more interrupt sources and for triggering storage of pending status data with an associated storage location within pending status data storage means for storing pending status data, said storage location representing an interrupt number of said message signalled interrupt within a global interrupt number space shared by said plurality of interrupt destinations; and
   a plurality of interrupt data reading means, each associated with a respective one of said plurality of interrupt destinations, for reading pending status data with an associated interrupt number within said global interrupt number space from said pending status data storage means and for triggering interrupt processing by said respective one of said plurality of interrupt destination.

23. A method of communicating message signalled interrupts between one or more interrupt sources and a plurality of interrupt destinations, said method comprising the steps of:
   receiving a message signalled interrupt from one of said one or more interrupt sources;
   triggering storage of pending status data with an associated storage location within pending status data storage circuitry, said storage location representing an interrupt number of said message signalled interrupt within a global interrupt number space shared by said plurality of interrupt destinations;
   reading for each respective one of said plurality of interrupt destinations pending status data with an associated interrupt number within said global interrupt number space from said pending status data storage circuitry; and
   triggering interrupt processing by said respective one of said plurality of interrupt destination.

\* \* \* \* \*